Patented Oct. 26, 1954

2,692,883

UNITED STATES PATENT OFFICE 2,692,883

5-NITRO-2-THENALMALONONITRILE AND PROCESS OF PREPARATION

Tracy M. Patrick, Jr., Marblehead Neck, Mass., and William S. Emerson, Dayton, Ohio, assignors to Monsanto Chemical Company, St. Louis, Mo., a corporation of Delaware No Drawing. Application June 1, 1953, Serial No. 358,943

5 Claims. (Cl. 260—329)

This invention relates to the preparation of 5-nitro-2-thenalmalononitrile.

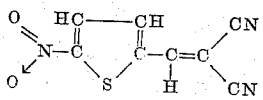

One object of the present invention is the preparation of the new compound 5-nitro-2-thenalmalononitrile. Another object of the invention is to provide a process for the preparation of this new chemical compound.

The 5-nitro-2-thenalmalononitrile is obtained in good yields by the reaction of substantially equimolecular quantities of 5-nitro-2-thiophenealdehyde and malononitrile in the presence of a suitable solvent, and then heating the mixture in the presence of a small amount of a catalytic organic base. Suitable solvents are, for example, methanol, ethanol, propanol, butanol, dioxane, ethyl acetate, benzene, toluene, xylene, chlorobenzene, and the like. The organic base catalyst is preferably an amine, as for example, piperidine, dimethylamine, diethylamine, dibutylamine, methyldodecylamine, triethanolamine, pyridine, morpholine and the like. The secondary amines are the preferred catalysts and piperidine is especially preferred. The 5-nitro-2-thenalmalononitrile can be isolated by chilling the reaction mixture and filtering the crystalline precipitate. The separation can be aided by the evaporation of a part of the solvent and/or by the addition of a nonsolvent. The crude product is then preferably recrystallized from a suitable solvent, for example, ethanol.

The particular proportions and methods of procedure set forth in the following examples are illustrative of a preferred embodiment of the invention only and are not intended to limit the scope of the invention.

Example 1

A mixture of 127 g. (1.24 moles) of acetic anhydride and 2 g. of stannous chloride dihydrate was introduced into a reaction vessel which was suspended in an ice bath and the said mixture cooled below 10° C. Then 112 g. (1.0 mole) of 2-thiophenealdehyde was slowly added thereto over a 45-minute period at the conclusion of which the temperature of the reaction mixture was below about 4° C. The ice bath was removed and the temperature of the reaction mixture rose to about 22° C. Then the ice bath was reapplied thereby temporarily reducing the temperature to 18° C. after which the temperature again began to rise. When the temperature reached about 24° C., ice and water were added directly to the reaction mixture. The acetic acid was then neutralized with sodium bicarbonate. The copious precipitate was filtered and well washed with an aqueous solution of sodium bicarbonate and then with a large quantity of distilled water. The precipitate was then dried in a vacuum oven (about 20 mm.) at 30 to 40° C. for 8 hours. The dried reaction product was then dissolved in benzene, filtered, and the filtrate evaporated to dryness under reduced pressure. The product was then dried in a vacuum oven (about 20 mm.) at 40 to 50° C. for 5.5 hours, to obtain about an 80 per cent yield of the reaction product identified as 2-thiophenealdehyde diacetate. An analytical sample crystallized from benzene solution by the addition of hexane had a melting point of 66–68° C.

Calculated for $C_9H_{10}O_4S$: C, 50.46; H, 4.68. Found: C, 50.66; H, 4.91.

Example 2

Solutions of 107 g. (0.5 mole) of 2-thiophenealdehyde diacetate in 200 ml. of acetic anhydride (I) and of 30 ml. of fuming nitric acid (d. 1.49–1.50) in 250 ml. of glacial acetic acid (II) were prepared. Half of solution II was introduced into a reaction vessel fitted with a stirrer, a thermometer, and a dropping funnel; said vessel being suspended in an ice bath and the stirred solution cooled to 5 to 10° C. Then half of solution I was added dropwise thereto over a 30-minute period during which period the temperature of the stirred reaction mixture was held between about 10 to 15° C. Then the balance of solution II was introduced cautiously to the mixture and thereafter the balance of solution I was added dropwise over an additional 30-minute period during which time the temperature was held between 10 to 15° C. similarly to the addition of the first portion. The cooling bath was removed and the amber reaction mixture was stirred at 30° C. for 90 minutes. Then the contents of the flask were poured into about one liter of finely crushed ice whereupon a yellow crystalline product was formed. The reaction mass was then filtered and the crystalline product was washed with cold water and pressed dry. The product was dissolved in about 350 ml. of benzene, filtered, and the filtrate washed with water until neutral. The benzene solution was distilled from a Claisen flask and 92.9 g. of a yellow liquid having a boiling point of about 155–165° C. at 1.5 mm., which liquid solidified in the receiver, was obtained. A portion of the solid product was recrystallized three times from ethanol and finally from a benzene-hexane mixture to give a crop of pale yellow tablets having a melting point of 71–75° C. The product was identified as 5-nitro-2-thiophenealdehyde diacetate and the yield was 72 per cent.

Calculated for $C_9H_9O_6NS$: N, 5.41. Found: N, 5.23.

*Example 3*

A 10-g. sample of the 5-nitro-2-thiophenealdehyde diacetate from Example 2 was introduced into a one liter Claisen flask with 500 ml. of 1 N hydrochloric acid and was steam distilled. A total of 4.6 g. of product was obtained and a portion thereof crystallized twice from aqueous ethanol and finally from water to give a product having a melting point of 75–76° C. The product was identified as 5-nitro-2-thiophenealdehyde and the yield was 76 per cent.

Calculated for $C_5H_3O_3NS$: C, 38.22; H, 1.92; N, 8.92. Found: C, 38.48; H, 8.02; N, 9.10.

The 5-nitro-2-thiophenaldehyde was oxidized to 5-nitro-2-thiophenecarboxylic acid and converted to the methyl ester to verify the position of the nitro group. The methyl 5-nitro-2-thiophenecarboxylate was found to have a melting point of 76° C. which is identical to that reported in the prior art [Rinkes, Rec. trav. chim., 51, No. 4, 1134 (1932)] whereas the corresponding 4-nitro derivative has a melting point of 99° C. (Rinkes, supra).

*Example 4*

A 3.3-g. sample (0.021 mole) of 5-nitro-2-thiophenealdehyde was dissolved in 50 ml. of boiling ethanol and then about 100 ml. of water was added thereto. Thereafter 3.0 g. (0.027 mole) of semicarbazide hydrochloride and 3.0 g. of anhydrous sodium acetate were added and the reaction mixture brought to reflux for 5 minutes. The reaction mixture was allowed to cool slowly and was finally chilled in ice. The precipitate was filtered and air dried. A portion of the product was crystallized from nitrobenzene, filtered, washed with ethanol and dried. This material was found to have a melting point of 242–243° C. The product was identified as 5-nitro-2-thiophenealdehyde semicarbazone and was obtained in substantially theoretical yield.

Calculated for $C_6H_6O_3N_4S$: C, 33.64; H, 2.80. Found: C, 33.94; H, 2.73.

*Example 5*

A mixture of 15.7 g. (0.10 mole) of 5-nitro-2-thiophenealdehyde and 6.6 g. (0.10 mole) of malononitrile was dissolved in 150 ml. of absolute ethanol in a reaction vessel and the mixture was heated to boiling. Two drops of piperidine were added to the amber solution which thereupon immediately changed to a clear dark brown. The reaction mixture was boiled for an additional 5 minutes and then chilled whereby a brown crystalline precipitate was formed. A total crop of 19.0 g. was obtained, a portion of which was recrystallized three times from ethanol to give a crop of tan crystals having a melting point of 149° C. The product was identified as 5-nitro-2-thenalmalononitrile and the yield was 93 per cent.

Calculated for $C_8H_3O_2N_3S$: C, 46.82; H, 1.47; N, 20.48. Found: C, 47.15; H, 1.66; N, 20.19.

Other routes by which 5-nitro-2-thenalmalononitrile may be prepared as as follows:

(1) Nitration of a dialkyl acetal of 2-thiophenealdehyde, with subsequent hydrolysis and then condensation with malononitrile.

(2) Formylation of 2-nitrothiophene, with subsequent condensation with malononitrile.

(3) Chloromethylation of 2-nitrothiophene, with subsequent hydrolysis, conversion to the aldehyde by oxidation, and condensation with malononitrile.

(4) Nitration of, for example, 2-thenyl chloride or 2-thenyl acetate, with subsequent hydrolysis, conversion to the aldehyde by oxidation, and condensation with malononitrile.

The new chemical compound of this invention is particularly valuable as a chemical intermediate and has also been shown to be useful in pharmaceutical compositions and biologically toxic compositions, for example, as an active ingredient in seed-treating agricultural fungicide compositions, and as an active ingredient in herbicidal compositions wherein the subject compound can be applied (1) by spraying aqueous suspensions of same, or (2) as dusts in admixture with known carriers, e. g., clay, bentonite, talc, pumice, Fuller's earth, lime, etc., or (3) as herbicidal sprays in organic solvents to prevent or control unwanted plant growth along roadways and the like. The 5-nitro-2-thenalmalononitrile is also a useful monomer in the preparation of various useful synthetic polymers. The subject dinitrile can be condensed with formaldehyde in the presence of a strong acid to produce useful polyamide resins in accordance with the procedure disclosed in the U. S. Patent 2,617,786 (see also J. Am. Chem. Soc. 72, 4439). The nitro group of the subject compound may be reduced to the amino group and thereafter, said compound condensed with formaldehyde in the presence of a strong acid to produce a useful cross-linked polyamide resin in accordance with the procedure disclosed in U. S. Patent 2,537,689. The 5-nitro-2-thenalmalononitrile may also be polymerized with various polymerizable monomers, e. g., styrene, etc., to provide novel copolymers, terpolymers, etc.

This application is a continuation-in-part of our application Serial No. 252,426, filed October 20, 1951, now abandoned.

The particular procedures herein described for the purpose of illustration are typical and preferred embodiments of the invention; it being apparent that different variations of the precise methods are possible without departing substantially from the invention which is defined in the following claims.

We claim:

1. 5-nitro-2-thenalmalononitrile.

2. The process for preparing 5-nitro-2-thenalmalononitrile which comprises heating a mixture of substantially molar equivalents of 5-nitro-2-thiophenealdehyde and malononitrile in a solvent in the presence of a small amount of an organic base, cooling the reaction mixture, and recovering the crystalline product.

3. The process of claim 2 herein the organic base is a secondary amine.

4. The process of claim 3 wherein the amine is piperidine.

5. The process of claim 4 wherein the solvent is ethanol and the reaction is carried out at about the boiling point of the reaction mixture at substantially atmospheric pressure.

No references cited.